(12) United States Patent
Kang et al.

(10) Patent No.: US 7,421,198 B2
(45) Date of Patent: Sep. 2, 2008

(54) METHOD FOR IMPLEMENTING THE RECONSTRUCTION OF AN OPTICAL NETWORK

(75) Inventors: Ning Kang, Guangdong (CN); Liang Liu, Guangdong (CN); Shengqiang Gao, Guangdong (CN); Xinhua Guo, Guangdong (CN)

(73) Assignee: Huawei Technologies Co., Ltd., Guangdong (CN)

( * ) Notice: Subject to any disclaimer, the term of this patent is extended or adjusted under 35 U.S.C. 154(b) by 568 days.

(21) Appl. No.: 11/131,064

(22) Filed: May 17, 2005

(65) Prior Publication Data

US 2005/0265729 A1    Dec. 1, 2005

Related U.S. Application Data

(63) Continuation of application No. PCT/CN03/00974, filed on Nov. 17, 2003.

(30) Foreign Application Priority Data

Nov. 17, 2002   (CN) ................. 02 1 52551

(51) Int. Cl.
  *H04B 10/08* (2006.01)
(52) U.S. Cl. ............... 398/25; 398/56; 398/58
(58) Field of Classification Search ............ 398/25, 398/50–58
  See application file for complete search history.

(56) References Cited

U.S. PATENT DOCUMENTS

| 5,724,509 A | 3/1998 | Starkweather et al. ... 395/200.5 |
| 6,079,020 A | 6/2000 | Liu ........................ 713/201 |
| 6,185,437 B1 | 2/2001 | Bark ....................... 455/560 |
| 6,418,123 B1* | 7/2002 | Kawakami et al. ........ 370/254 |
| 6,434,611 B1 | 8/2002 | Wilson et al. .............. 709/221 |
| 7,194,206 B2* | 3/2007 | Weverka et al. ............ 398/45 |
| 7,218,851 B1* | 5/2007 | Zang ........................ 398/33 |
| 2004/0208513 A1* | 10/2004 | Peddanarappagari et al. .. 398/25 |

FOREIGN PATENT DOCUMENTS

| CN | 1219254 | 6/1999 |
| CN | 1267438 | 9/2000 |
| CN | 1377158 | 10/2002 |

OTHER PUBLICATIONS

International Search Report in PCT/CN03/00974 dated Feb. 5, 2004.

* cited by examiner

*Primary Examiner*—Dzung D Tran
(74) *Attorney, Agent, or Firm*—Marshall, Gerstein & Borun LLP

(57) ABSTRACT

A method for implementing the reconstruction of an optical network. In the operating system (OS) side, the OS with trail function calculates data of the OS side and the network element side needed by the reconstruction base on the inputted physical information related to the optical network reconstruction and the stored data related to the network, then the OS divides the expansion procedure into smaller steps to modify said data one by one, thus accomplishing the reconstruction of the optical network. The invention can automatically reconstruct an optical network without interrupting the traffic thereof, and the method being simpler, more reliable and less risky one compared with the prior manual method.

9 Claims, 12 Drawing Sheets

METHOD FOR IMPLEMENTING THE RECONSTRUCTION OF AN OPTICAL NETWORK

CROSS-REFERENCE TO RELATED APPLICATION

This is a continuation of copending International Application No. PCT/CN2003/000974, filed Nov. 17, 2003, the entire disclosure of which is incorporated herein by reference.

BACKGROUND OF THE INVENTION

1. Field of the Invention

The invention relates to the maintenance of an optical network, especially to a method for implementing the reconstruction of an optical network.

2. Related Technology

As communication demand continuously increases, available capacity of an optical network has not been able to satisfy the increasing demand of users. Therefore, expansion and reconstruction of an optical network is needed in order to carry more services.

At present, operation of an optical network reconstruction mainly depends on the experience of engineers. Engineers have to manually modify the data to the values that are appropriate for the expanded optical network step by step on the Operation System (OS) of network management, such as an Element Management System (EMS), or on Network Elements (NE), such as a Local Craft Terminal (LCT), by such tools as command lines.

There are disadvantages of the manual method mentioned above, such as being more difficult to carry out modification and having too many operation steps. Since a telecommunication network is sophisticated and handles a large amount of data, for each reconstruction, all the affected data must be determined beforehand, and then modified one by one. Even for an experienced engineer, it is possible that some data are omitted, or a data value is inconsistent on the two sides: the OS and the NE. Usually, reconstruction by the manual method takes more time, and the traffic needs to be interrupted for a long time during the reconstruction. Furthermore, when the expansion fails, it is also difficult and complex to recover an optical network to its original state. Therefore, expansion and reconstruction of a communication network, especially a telecommunication network not permitting interruption of the services, with a manual method not only has risk but also causes more inconvenience for the users.

GENERAL DESCRIPTION

The invention provides a method for implementing the automatic reconstruction of optical network so as to reduce the difficulty and complexity, shorten the modification time and avoid traffic interruption as much as possible.

The objective is realized with the following scheme:

A method for implementing the reconstruction of an optical network includes the steps of:
  a) inputting physical information needed for the optical network reconstruction;
  b) the OS calculating the data needed for the optical network reconstruction based on the inputted physical information and stored data therein related to the network; and
  c) the OS modifying data at the OS side according to the calculation in Step b) and delivering data of NE side out of the calculation in Step b) to NEs.

The method further may include before Step b):
  b1) the OS judging whether the said inputted information is legal, and, if yes, going to the next step; otherwise, ending.

The said Step c) may comprise:
  the OS modifying network layer data and configuration layer data, respectively; and
  delivering configuration layer data needed by NE side to the corresponding NEs immediately after the said configuration layer data have been modified.

The modification in Step c) may be divided into more than one sub-step, each of the sub-step carrying out the modification of some of the data.

The said modification in Step c) may further comprise:
  the OS judging whether a sub-step is successful whenever the sub-step has been executed, and, if yes, storing the modified data, then going to the following sub-step; otherwise, operating from the current state in the reversed order to recover the data having been modified in each executed step and rolling back to the original state before the reconstruction.

The method may further comprise:
  the OS storing all the current data before each step of the optical network reconstruction; and
  if the said reversed operation fails, ending the current modification procedure and displaying the data stored before the reconstruction of the optical network.

If the optical network reconstruction is to add an extensive sub-rack, Step c) in the method may comprise the following sub-steps:
  c11) in the configuration layer, deleting from the main-rack the cross-connections related to the tributary board to be moved, and delivering the modified data of the NE side to the corresponding NEs;
  c12) in the configuration layer, deleting from the main-rack the tributary board to be moved, and delivering the modified data of the NE side to the corresponding NEs;
  c13) in the configuration layer, creating in the said main-rack line boards for fiber connection, and delivering the modified data of the NE side to the corresponding NEs;
  c14 in the configuration layer, creating in the extensive sub-rack line boards for fiber connection, and delivering the modified data of the NE side to the corresponding NEs;
  c15) in the configuration layer, creating in the extensive sub-rack a tributary board, to which moving the tributary board of the main-rack, and delivering the modified data of the NE side to the corresponding NEs;
  c16) in the network layer, creating fibers and non-protected links between the main-rack and the extensive sub-rack;
  c17) in the configuration layer, creating in the main-rack and the extensive sub-rack the cross-connections related to the moved tributary board; and delivering the modified data of the NE side to the corresponding NEs; and
  c18) in the network layer, modifying the related circuits, then ending.

If the optical network reconstruction is to make a board moving, Step c) of the method may specifically comprise the following sub-steps:
  c21) in the configuration layer, deleting the cross-connections related to the board to be moved, and delivering the modified data of the NE side to the corresponding NEs;
  c22) in the configuration layer, deleting the protection group for the configuration layer related to the board to be moved, and delivering the modified data of the NE side to the corresponding NEs;

c23) in the configuration layer, deleting the board to be moved, and delivering the modified data of the NE side to the corresponding NEs;

c24) in the configuration layer, creating a board in the destination position, and delivering the modified data of the NE side to the corresponding NEs;

c25) in the configuration layer, creating the protection group for the configuration layer on the newly created boards, and delivering the modified data of the NE side to the corresponding NEs;

c26) in the configuration layer, creating cross-connections on the newly created boards, and delivering the modified data of the NE side to the corresponding NEs; and c27) in the network layer, modifying the circuits and the protection subnetworks based on the moved board, then ending.

If the optical network reconstruction is to change a board type, Step c) in the method may specifically comprise the following sub-steps:

c31) in the configuration layer, deleting the cross-connections related to the board of which the type is to be modified, and delivering the modified data of the NE side to the corresponding NEs;

c32) in the configuration layer, deleting the protection group for the configuration layer related to the board of which the type is to be modified, and delivering the modified data of the NE side to the corresponding NEs;

c33) in the configuration layer, deleting the board of which the type is to be modified, and delivering the modified data of the NE side to the corresponding NEs;

c34) in the configuration layer, creating a board with the destination type, and delivering the modified data of the NE side to the corresponding NEs;

c35) in the configuration layer, creating the protection group for the configuration layer on the newly created board, and delivering the modified data of the NE side to the corresponding NEs;

c36) in the configuration layer, creating cross-connections on the newly created boards, and delivering the modified data of the NE side to the corresponding NEs; and c37) in the network layer, modifying the related circuits and protection subnetworks according to the board with the new type, then ending.

If the optical network reconstruction is to add or delete a Network Element (NE) on a protection subnetwork, Step c) in the method may specifically comprise the following sub-steps:

c41) in the network layer, modifying fibers connection;

c42) in the configuration layer, modifying the protection group for the configuration layer, and delivering the modified data of the NE side to the corresponding NEs;

c43) in the configuration layer, modifying the related circuits, creating cross-connections in the newly created NEs, and delivering the modified data of the NE side to the corresponding NEs;

c44) judging whether the current protection subnetwork is a Multiplex Section Protection (MSP) ring; if yes; adjusting the NE's ID on the MSP ring and going to Step c45; otherwise, directly going to Step c45; and c45) judging whether the current protection subnetwork is a MSP ring, if yes, starting the MSP protocol and ending; otherwise, ending the current procedure directly.

The related physical information of the optical network reconstruction of this method may comprise: NE identity, board identity, port identity, fiber identity, or combinations of the above four identities before and after the optical network reconstruction.

After delivering the NE side data to NEs, this method may further comprise: letting the NEs deliver the data once for all to the board thereof after the reconstruction has been completed.

It can be seen from the above description, by means of the method of the invention, the OS with trail function can automatically calculate and modify the data for the optical network reconstruction based on the physical information inputted by users needed for the reconstruction, and deliver the modified data of the NE side to the corresponding NEs, thus completing the reconstruction. With this method, manual operation in an optical network reconstruction is simplified, requirement for skilled network maintenance engineers is lowered, and the advantage of OS in information and resource is fully utilized. Since it is the OS that implements the calculation, modification and delivering of the data, the optical network reconstruction is made more reliable and faster. Furthermore, since the network layer data and configuration layer data are modified separately during reconstructing an optical network with this method, the number of affected NEs and data are minimized and operation risks are effectively reduced. In addition, if an error occurs during data modifying, the OS will automatically carry out reversed operations to recover the data in the original state before the reconstruction so that the correctness of the modified data is guaranteed and the reliability of the reconstruction is further improved.

In summary, with the solution of this invention, operations of an optical network reconstruction, such as adding an extensive sub-rack, moving a board, changing a board type, adding or deleting a NE in the protection subnetwork, can be easily and reliably implemented. As the optical network reconstruction is implemented automatically by the OS under the precondition of interrupting the least possible traffic, efficiency of the reconstruction is improved and risk is reduced.

DETAILED DESCRIPTION OF PREFERRED EMBODIMENTS OF THE INVENTION

The invention will be described in more detail with reference to drawings and embodiments.

According to the invention, after the reconstruction of hardware has been completed, the user will select the operation to be carried out for the current optical network reconstruction, i.e. inputting the related physical information, such as network element identities before and after reconstruction, board identities, port identities and fiber identities. Then, the OS with trail function, such as the EMS or the Network Management System (NMS), will calculate data for reconstructing the network both on the OS side and the NE side based on the related physical information selected by the user and the data having been stored therein. After that, the OS will divide the procedure of reconstruction into a number of sub-steps and modify the data related to the reconstruction one by one, thus completing the optical network reconstruction.

In addition, in order to minimize network elements and data that are affected during reconstructing the network, the approach of modifying the data of the configuration layer and the network layer separately is adopted. That is, the protection subnetworks, fibers, trails in the network layer as well as the protection groups, cross-connections in the configuration layer are modified separately. In this way, during modifying the network layer data, the network element data will not be affected; and during modifying the configuration layer data, at most two network elements are affected. Therefore, the risk is effectively reduced.

In the following, procedures for adding an extensive sub-rack, moving a board, changing type of a board, and adding or deleting a network element on a protection sub-network will be described in more detail.

The procedure for adding an extensive sub-rack is as follows:

When the add/drop capability of a tributary is not enough, usually a new sub-rack is added to extend the tributary add/drop capability. In this case, a board needs to be moved from the main-rack to the extensive sub-rack. During the optical network expansion, a fiber and a non-protected link are created between the main-rack and the extensive sub-rack, so the traffic originally in the main-rack will pass through the main-rack, add/drop at the tributary board of the extensive sub-rack.

Figure 1:
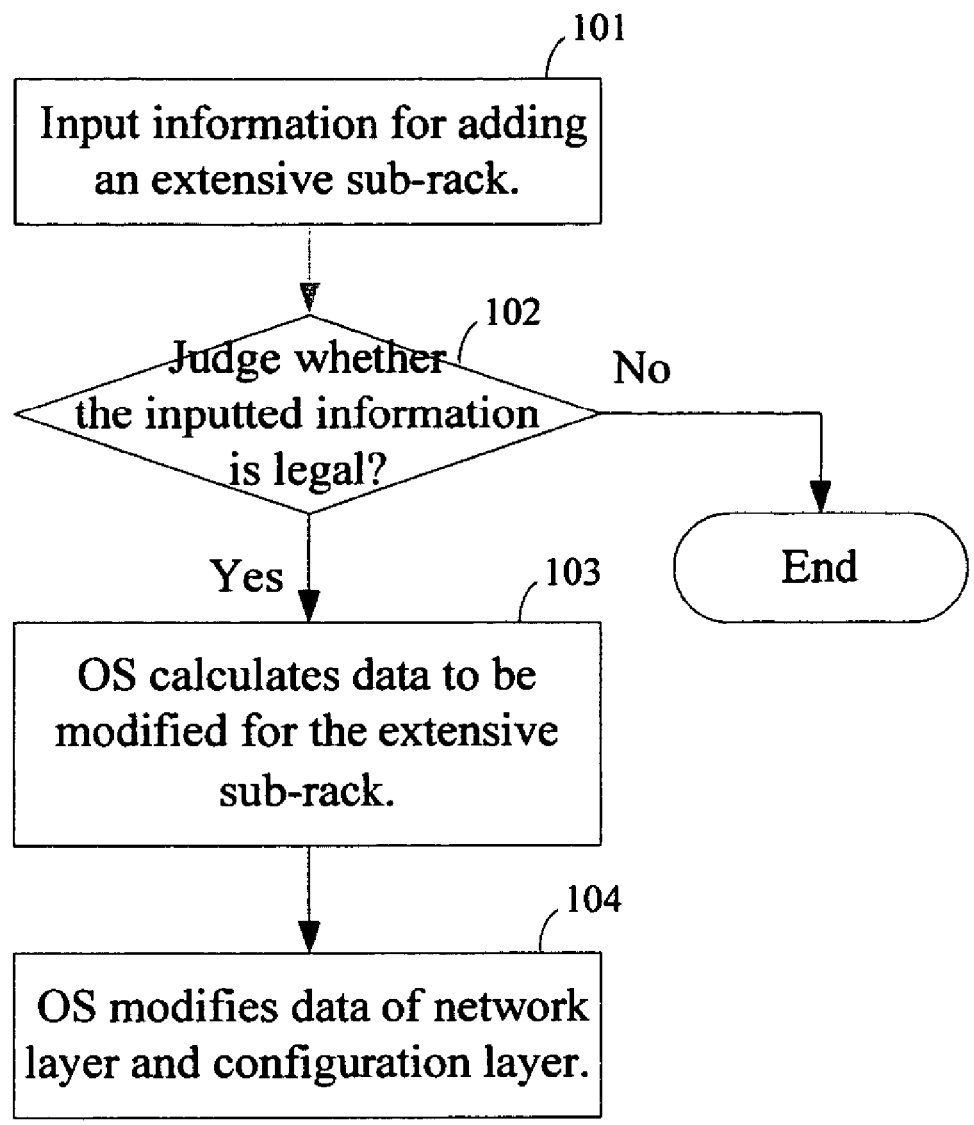
FIG. 1 shows a flowchart by the invention for adding an extensive sub-rack.

FIG. 1 shows the steps for adding a extensive sub-rack.

Step 101: Input the related physical information for adding an extensive sub-rack.

Figure 2:
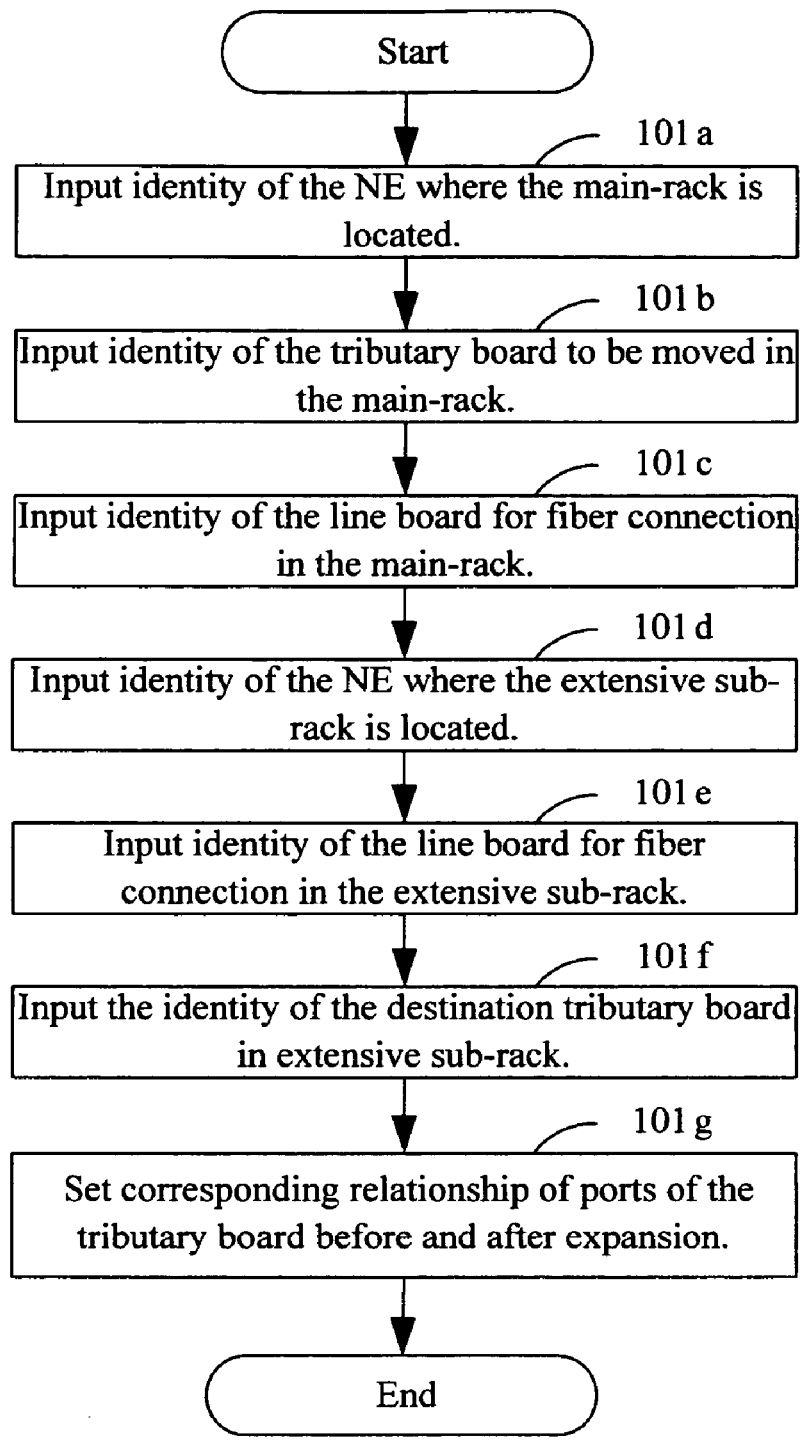
FIG. 2 shows a sub-flowchart for inputting physical information in the process of adding an extensive sub-rack.

In this step, for simplifying the user's operation, prompts are used to lead the user to input the information step by step, the flowchart is shown in FIG. 2.

Step 101a: Identify of the network element where the main-rack to be modified is located.

Step 101b: Input identity of the tributary board to be moved in the main-rack.

Step 101c: Input identity of the line board for fiber connection in the main-rack.

Step 101d: Input identity of the network element where the extensive sub-rack is located.

Step 101e: Input identity of the line board for fiber connection in the extensive sub-rack.

Step 101f: Input identity of the destination tributary board in the extensive sub-rack.

Step 101g: Set corresponding relationship of ports of the tributary board before and after moving the location.

Step 102: The OS analyses the inputted information, judges whether the information inputted is legal, if it is illegal, exit and the procedure is ended; otherwise, go to Step 103.

Step 103: The OS carries out the calculation needed for the extensive sub-rack and determines the data of the configuration layer and the network layer that need to be modified based on the inputted information and the data of the configuration layer and network layer stored in the OS database.

In this step, the calculation comprises the steps of: the OS calculating the data based on the inputted physical information, the current state of the network, and the related data of the configuration layer and network layer, then obtaining the data of the two layers needed to be modified and updated for the current reconstruction.

Step 104: The OS modifies at the OS side the network layer data and configuration layer data, respectively; when the configuration layer data have been modified, the OS delivers the configuration layer modified data of the NE side to the corresponding NEs immediately.

Figure 3:
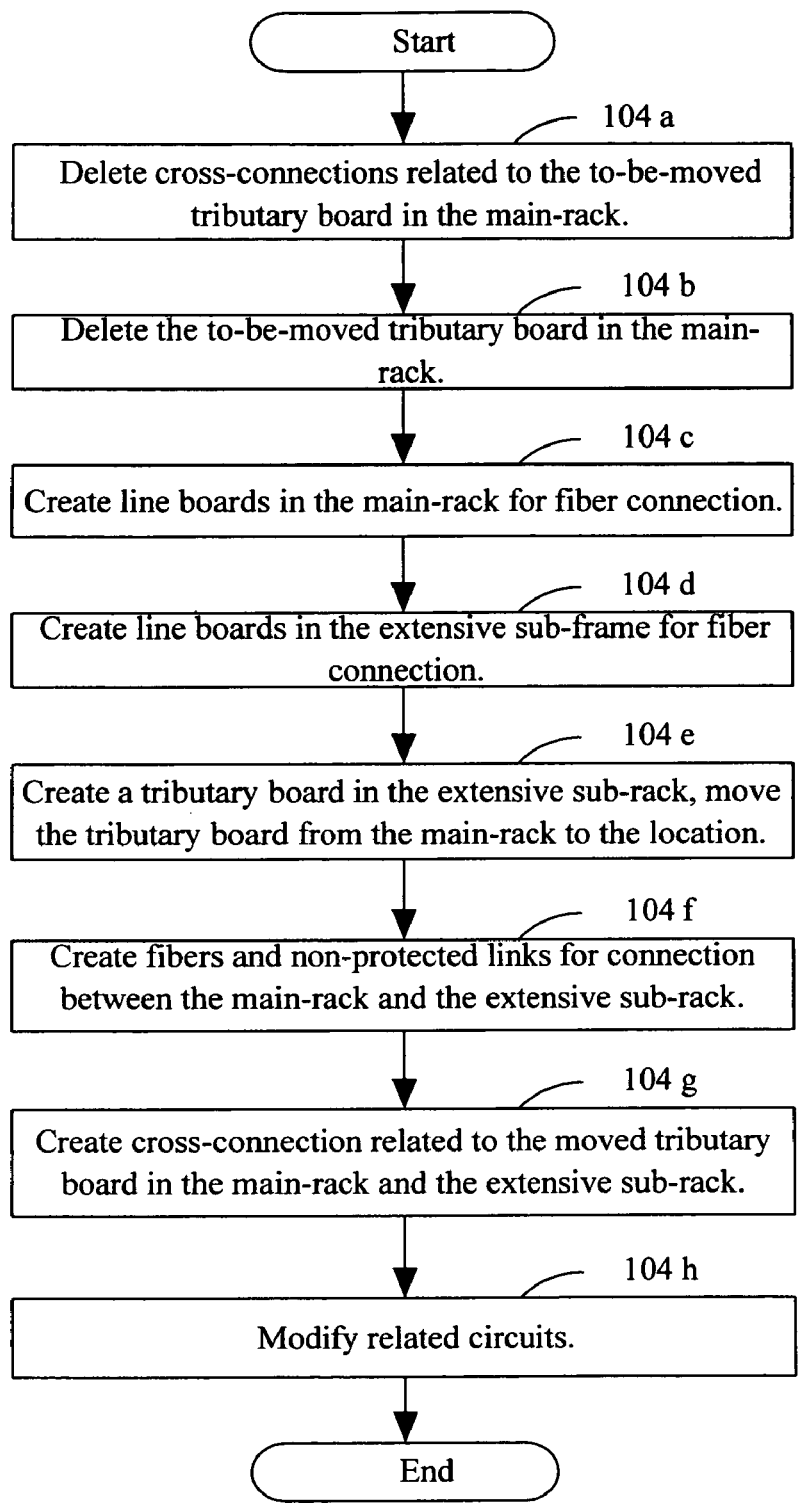
FIG. 3 shows a sub-flowchart for modifying data in the process of adding an extensive sub-rack.

This step may include the following sub-steps as shown in FIG. 3:

Step 104a: In the configuration layer, delete cross-connections related to the to-be-moved tributary board in the main-rack, and deliver the modified data of the NE side to the corresponding NEs.

Step 104b: In the configuration layer, delete the to-be-moved tributary board in the main-rack, and deliver the modified data of the NE side to the corresponding NEs.

Step 104c: In the configuration layer, create line boards in the main-rack for fiber connection; and deliver the modified data of the NE side to the corresponding NEs.

Step 104d: In the configuration layer, create line boards in the extensive sub-rack for fiber connection; and deliver the modified data of the NE side to the corresponding NEs.

Step 104e: In the configuration layer, create a tributary board in the extensive sub-rack, move the tributary board from the main-rack to the location thereof; and deliver the modified data of the NE side to the corresponding NEs.

Step 104f: In the network layer, create fibers and non-protected links for connection between the main-rack and the extensive sub-rack.

Step 104g: In the configuration layer, create cross-connections related to the moved tributary board in the main-rack and the extensive sub-rack; and deliver the modified data of the NE side to the corresponding NEs.

Step 104h: In the network layer, modify the related circuits.

In the above sub-steps of Step 104, the OS stores the current data before the reconstruction; whenever a sub-step has been executed, the OS judges whether this sub-step is successful, waits, if there are data needed to be delivered to NEs, for the acknowledgement from the NEs and further judges whether the returned message is a message of success; if yes, stores the current data and goes to the next step; otherwise, a roll back operation is carried out, i.e. a reversed order of the modification operations is made to recover the state before the modification and an error message is prompted. If the roll back operation fails, the operation is stopped immediately, and the data stored before the reconstruction are displayed for the user to deal with.

In the following, operation of moving a board is described.

During an optical network expansion, sometimes it is necessary to move a board from one slot to another slot, in this case the user needs only to show the physical information related to the destination slot, and then the OS will automatically perform the moving operation, such as modifying the data of the corresponding circuits and protection sub-network, and will deliver the corresponding data to NEs.

Figure 4:
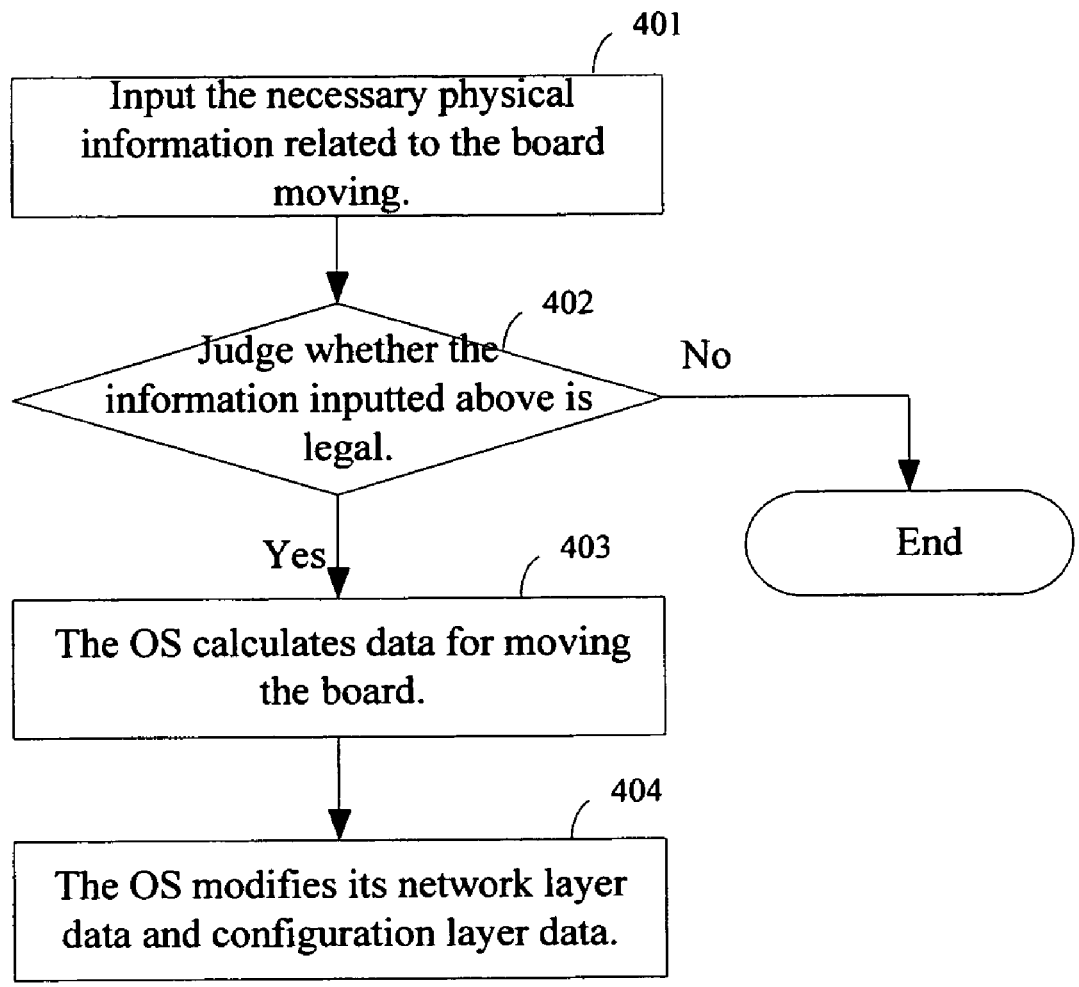
FIG. 4 shows a flowchart by this invention for moving a board position.

FIG. 4 shows the steps for moving a board:

Step 401: Input the related physical information for moving a board.

Figure 5:
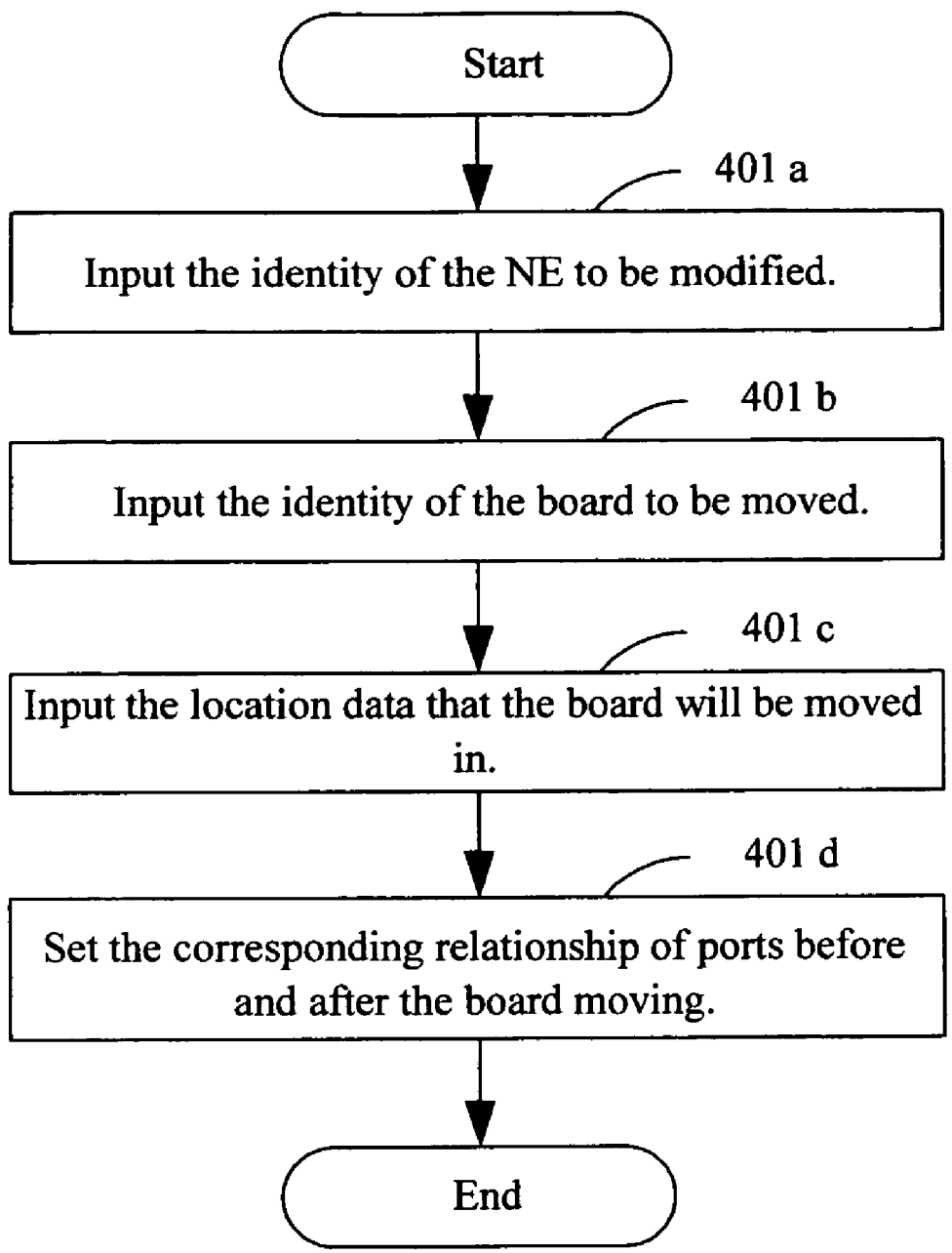
FIG. 5 shows a sub-flowchart for inputting physical information in the process of moving a board position.

For simplicity, prompts are used to lead the client to input the information in this Step, the inputting flowchart is shown in FIG. 5.

Step 401a: Input the identity of the NE to be modified.

Step 401b: Input the identity of the board to be moved.

Step 401c: Input the location to which the board will be moved.

Step 401d: Set the corresponding relationship of ports before and after moving the board.

Step 402: The OS judges whether the information inputted above is legal. If it is illegal, exit and the procedure is ended; otherwise, go to next step.

Step 403: The OS makes calculation needed for moving the board based on the inputted information and the related data in the configuration layer and network layer stored in the OS database so as to determine the configuration and network layer data to be modified for moving the board.

The calculation in this sub-step is: the OS calculating the data based on the inputted physical information, the current state of the network, and the related data of the configuration layer and network layer, and obtaining the data of the configuration layer and network layer to be modified and updated for the current reconstruction of the optical network.

Step 404: The OS modifies at the OS side the network layer data and configuration layer data, respectively; when the configuration layer data have been modified, the OS delivers the configuration layer modified data of the NE side to the corresponding NEs, immediately.

Figure 6:
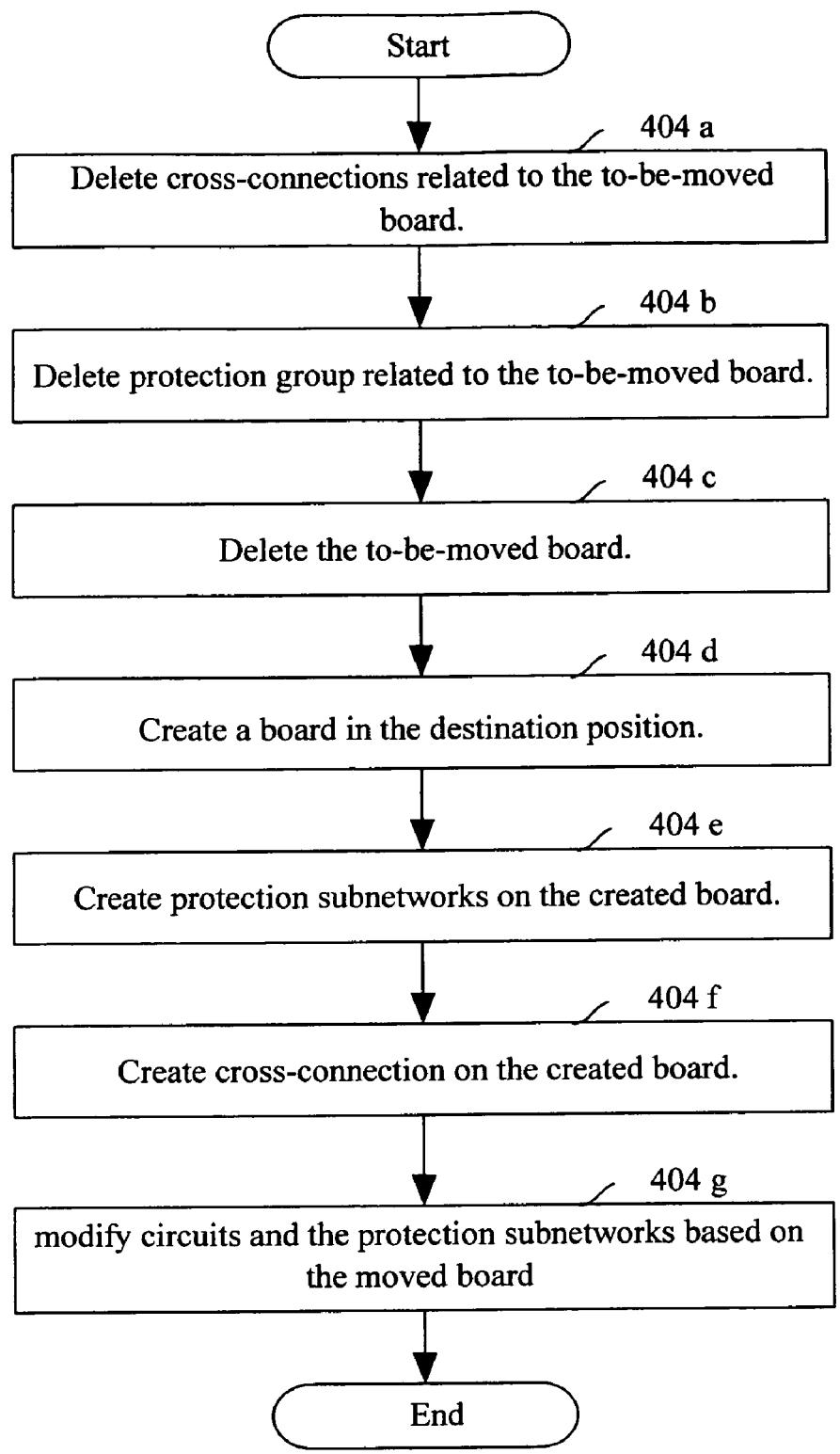
FIG. 6 shows a sub-flowchart for modifying data in the process of moving a board position.

This step includes the following sub-steps as shown in FIG. 6.

Step 404a: In the configuration layer, delete cross-connections related to the to-be-moved board, and deliver the modified data of the NE side to the corresponding NEs.

Step 404b: In the configuration layer, delete the protection group related to the to-be-moved board, and deliver the modified data of the NE side to the corresponding NEs.

Step 404c: In the configuration layer, delete the to-be-moved board, and deliver the modified data of the NE side to the corresponding NEs.

Step 404d: In the configuration layer, create a board in the destination position, and deliver the modified data of the NE side to the corresponding NEs.

Step 404e: In the configuration layer, create protection group for the configuration layer on the newly created boards, and deliver the modified data of the NE side to the corresponding NEs.

Step 404f: In the configuration layer, create cross-connections on the created board, and deliver the modified data of the NE side to the corresponding NEs.

Step 404g: In the network layer, modify the circuits and the protection subnetworks based on the moved board.

In the above sub-steps of Step 404, the OS stores the data before the reconstruction; whenever a sub-step has been executed, the OS judges whether this sub-step is successful, waits, if there are data needed to be delivered to NEs, for the acknowledgement from the NEs and further judges whether the returned message is a message of success; if yes, the data after modification is stored and go to the next step; otherwise, a roll back operation is carried out, i.e. a reversed order of the modification operation is made to recover the state before the modification and an error message is prompted. If the roll back operation fails, the operation is stopped immediately, and the data stored before reconstruction are displayed for the user to deal with.

In the following, operation of changing a board type is described.

Based on the expansion of system function, it is possible to substitute a board with a new one that has a larger number of ports and larger capacity, in this case the client needs only to select the types of the board to be changed and the type to which the board is to change, and then the OS will automatically complete the data changes for the circuits and the protection subnetworks. The types of a board includes the tributary board type and line board type.

Figure 7:
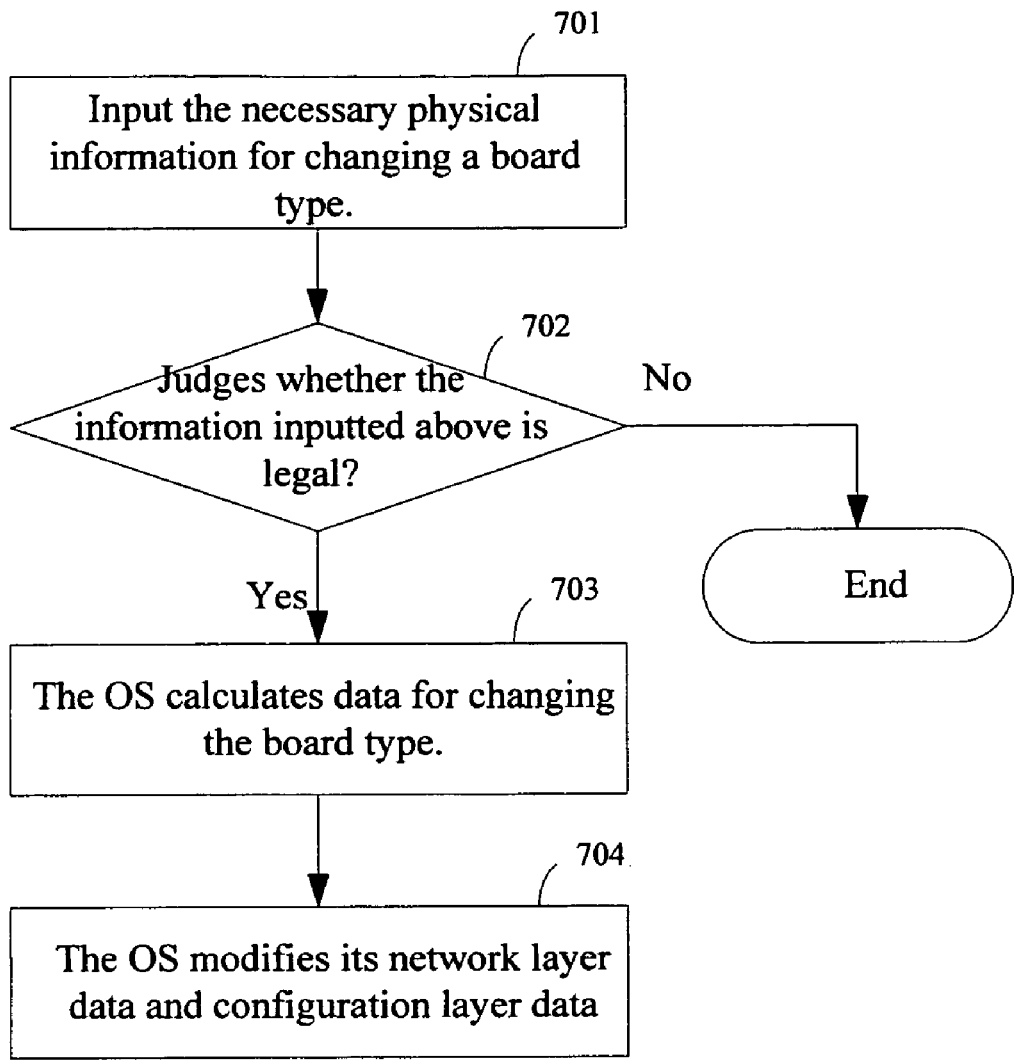
FIG. 7 shows a flowchart by this invention for changing the type of a board.

FIG. 7 shows the steps for changing a board type:

Step 701: Input the necessary physical information for changing a board type.

Figure 8:
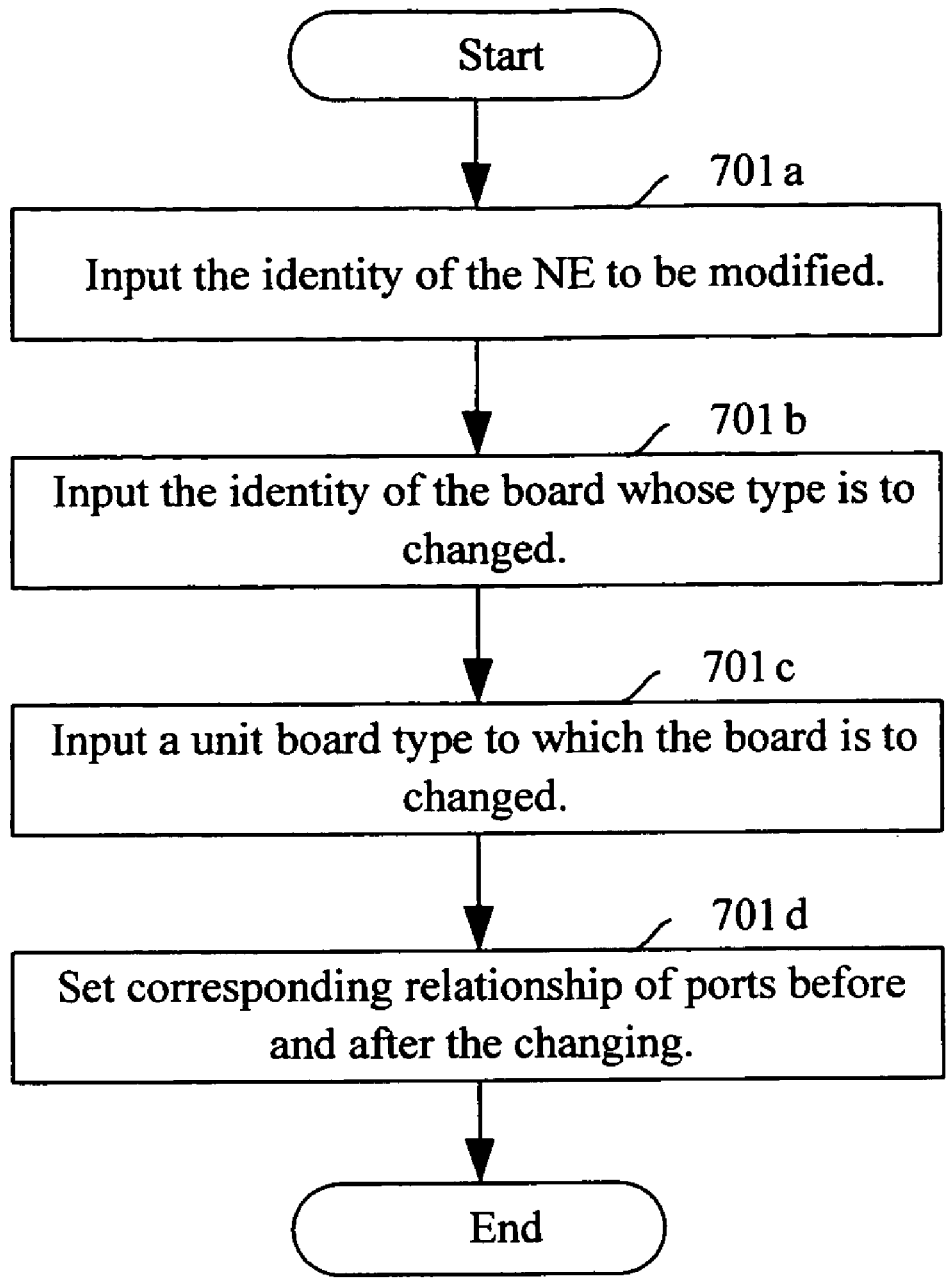
FIG. 8 shows a sub-flowchart for inputting physical information in the process of changing the type of a board.

For simplicity, prompts are used to lead the client to input the information needed in this Step, the inputting flowchart is shown in FIG. 8.

Step 701a: Input the identity of the NE to be modified.

Step 701b: Input the identity of the board of which the type is to be changed.

Step 701c: Input the type to which the board is to be changed.

Step 701d: Set the corresponding relationship of ports before and after the changing.

Step 702: The OS judges whether the information inputted is legal. If it is illegal, exit and the procedure is ended; otherwise, go to next step.

Step 703: The OS makes calculation needed for changing the board type based on the inputted information and the related data in the configuration layer and network layer stored in the OS database so as to determine the configuration layer and network layer data to be modified for changing the board type.

The calculation in this step is: the OS calculating the data based on the inputted physical information, the current state of the network, and the related data of the configuration layer and network layer, and obtaining the data of the configuration layer and network layer to be modified and updated for the current reconstruction of the optical network.

Step 704: The OS modifies at the OS side the network layer data and configuration layer data, respectively; when the configuration layer data have been modified, the OS delivers the configuration layer modified data of the NE side to the corresponding NEs, immediately.

Figure 9:
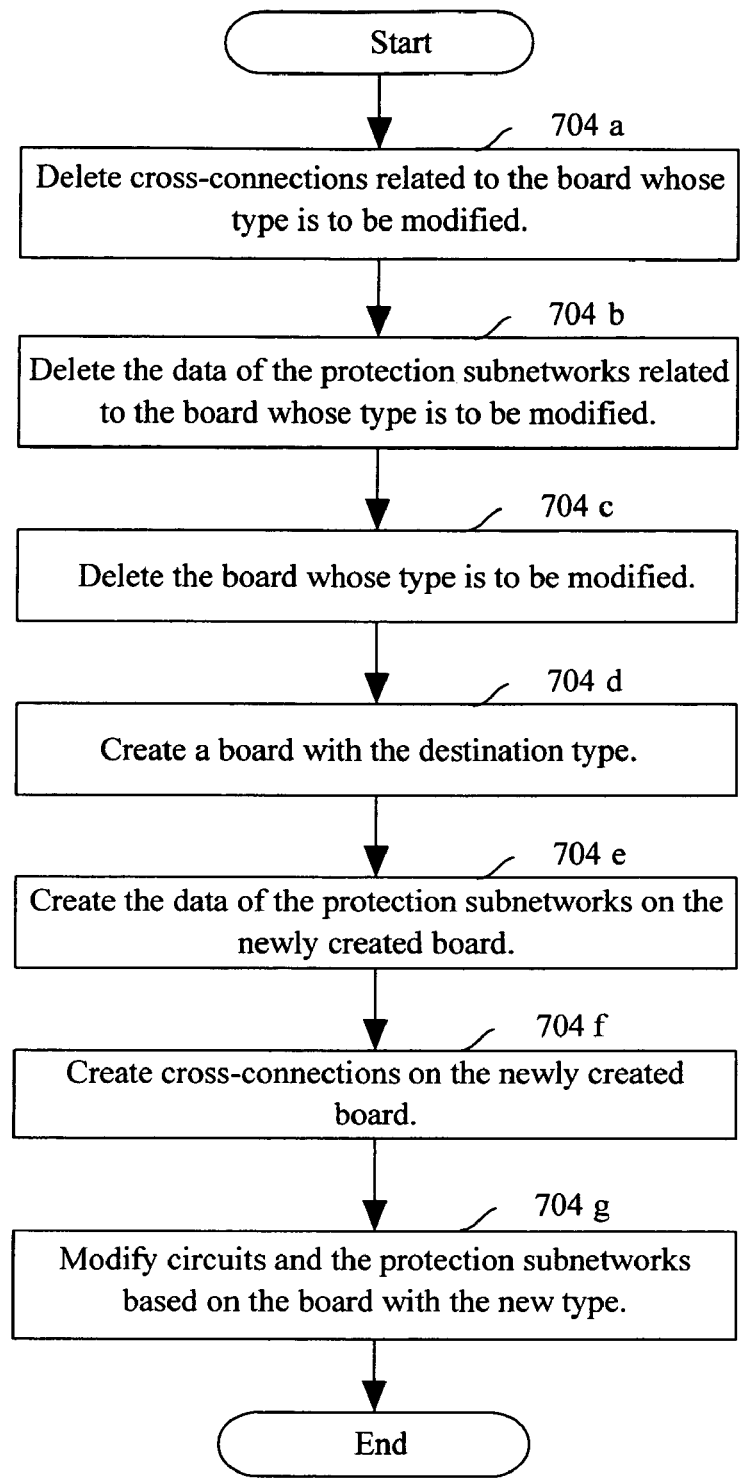
FIG. 9 shows a sub-flowchart for modifying data in the process of changing the type of a board.

This step includes the following sub-steps as shown in FIG. 9.

Step 704a: In the configuration layer, delete cross-connections related to the board of which the type is to be modified, and deliver the modified data of the NE side to the corresponding NEs.

Step 704b: In the configuration layer, delete the data of the protection subnetworks related to the board of which the type is to be modified, and deliver the modified data of the NE side to the corresponding NEs.

Step 704c: In the configuration layer, delete the board of which the type is to be modified, and deliver the modified data of the NE side to the corresponding NEs.

Step 704d: In the configuration layer, create a board with the destination type, and deliver the modified data of the NE side to the corresponding NEs.

Step 704e: In the configuration layer, create the protection group for the configuration layer on the newly created board, and deliver the modified data of the NE side to the corresponding NEs.

Step 704f: In the configuration layer, create cross-connections on the newly created board, and deliver the modified data of the NE side to the corresponding NEs.

Step 704g: In the network layer, modify the circuits and the protection subnetworks based on the board with the new type.

In the above sub-steps of Step 704, the OS stores the current data before the reconstruction. Whenever a sub-step has been executed, the OS judges whether this sub-step is successful, waits, if there are data to be delivered to NEs, for the acknowledgement from the NEs and further judges whether the returned message is a message of success, if yes, the data after modification is stored and go to the next step; otherwise, a roll back operation is carried out, i.e. a reversed order of the modification operation is made to recover the state before the modification and an error message is prompted. If the roll back operation fails, the operation is stopped immediately, and the data before reconstruction are displayed for the user to deal with.

In the following, operation of adding or deleting a NE in the protection subnetwork is described.

For a channel protection ring and Sub-network Connection (SNC) protection, by means of the method of this invention, the working traffic in the fiber is automatically switched to the protect channel when disconnecting a fiber to add a node, then the node is added, the fiber is reconnected, and traffic passing is made directly, thus ensuring the original traffic is not interrupted and returns to the working channel. For a Multiplex Section Protection (MSP) ring or a linear multiplexing link, by means of the method of this invention, a passing traffic is generated automatically when disconnecting a fiber to add a node, and then the MSP ring is switched, thus ensuring the traffic in the loop is not interrupted when adding a node. After the expansion is accomplished, the network will return to the working state from the switching state, thus ensuring that the MSP works well.

Figure 10:
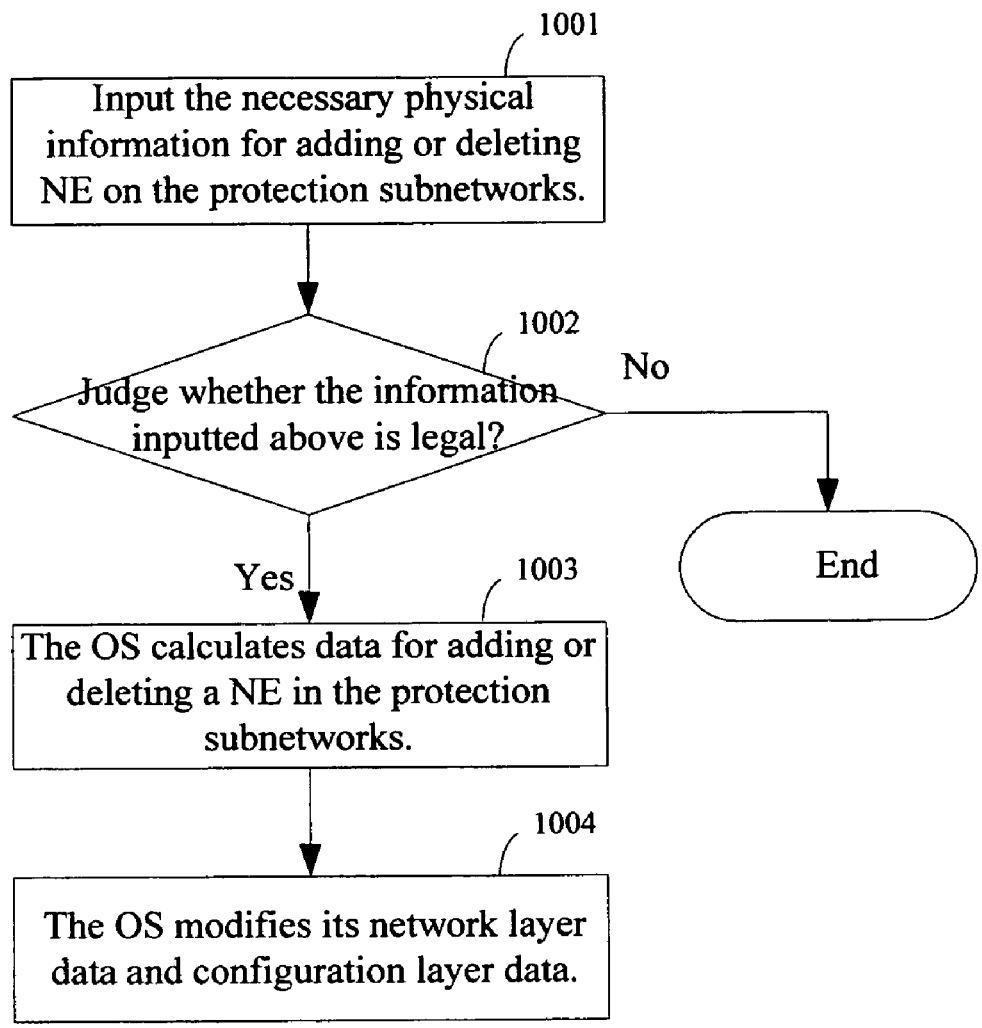
FIG. 10 shows a flowchart by this invention for adding or deleting a network element on the protection subnetwork.

FIG. 10 shows the steps for adding or deleting an NE on the protection subnetwork:

Step 1001: Input the necessary physical information for adding or deleting an NE on the protection subnetwork.

Figure 11:
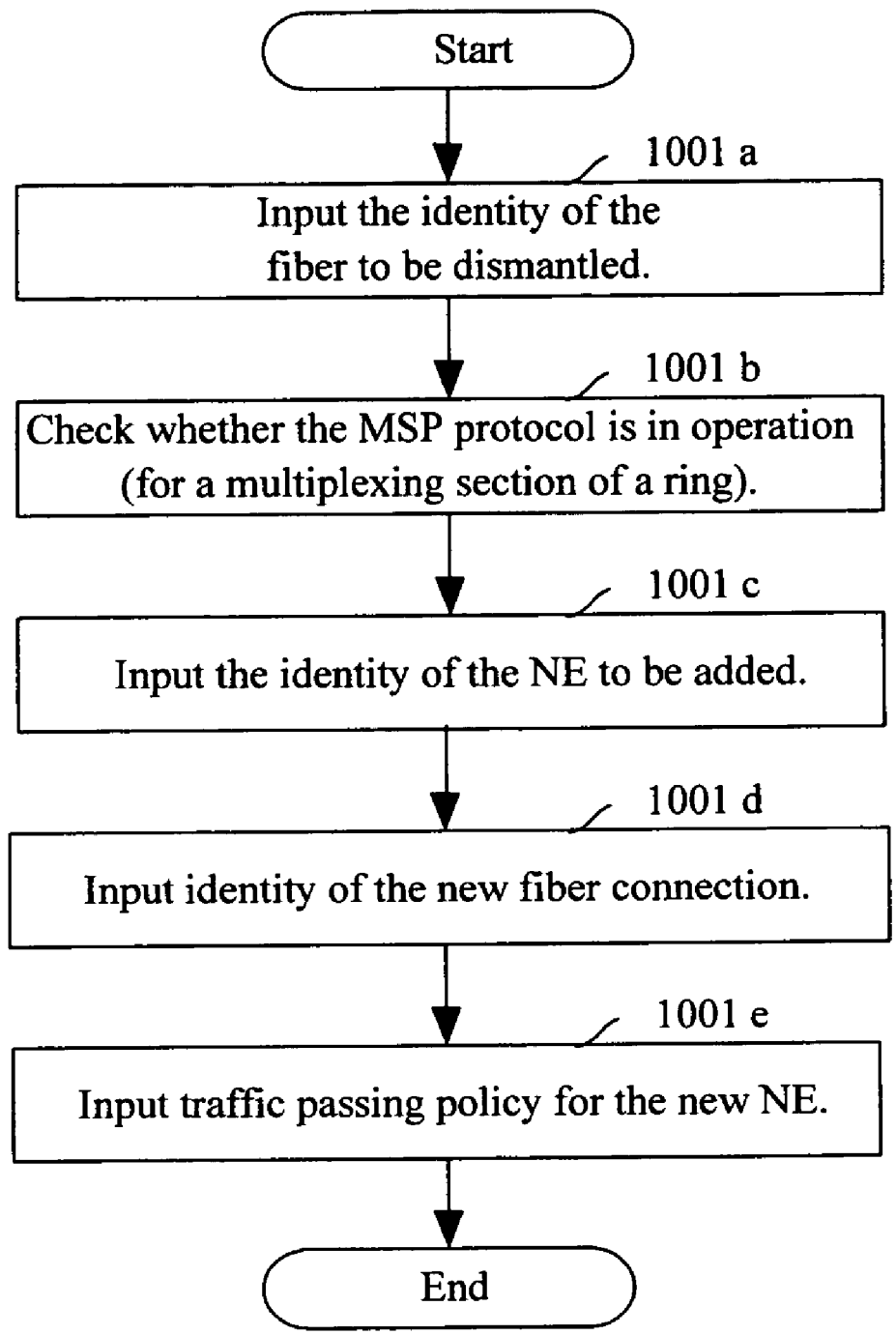
FIG. 11 shows a sub-flowchart for inputting physical information in the process of adding or deleting a network element on the protection subnetwork.

For simplicity, prompts are used to lead the client to input the information needed in this Step, the inputting flowchart is shown in FIG. 11.

Step 1001*a*: Input the identity of the fiber to be dismantled.

Step 1001*b*: For a network with a MSP ring, first check whether the MSP protocol is in operation; if yes, input the current state in the MSP ring, otherwise, go to next step directly.

Step 1001*c*: Input the identity of the NE to be added.

Step 1001*d*: Input the identity of the new fiber connection.

Step 1001*e*: Input the traffic passing policy for the new NE.

Step 1002: The OS judges whether the information inputted above is legal. If it is illegal, exit and the procedure is ended; otherwise, go to next step.

Step 1003: The OS carries out the calculation needed for adding or deleting an NE in the protection subnetwork based on the inputted information and the data of the configuration layer and network layer stored in the OS database so as to determine the data of the configuration layer and the network layer to be modified for adding or deleting an NE in the protection subnetwork.

In this step, the calculation is: the OS calculating the data based on the inputted physical information, the current state of the network, and the related data of the configuration layer and network layer, and obtaining the data of the two layers needed to be modified and updated for the current reconstruction.

Step 1004: The OS modifies at the OS side the network layer data and configuration layer data, respectively; when the configuration layer data have been modified, the OS delivers the configuration layer modified data of the NE side to the corresponding NEs, immediately.

Figure 12:
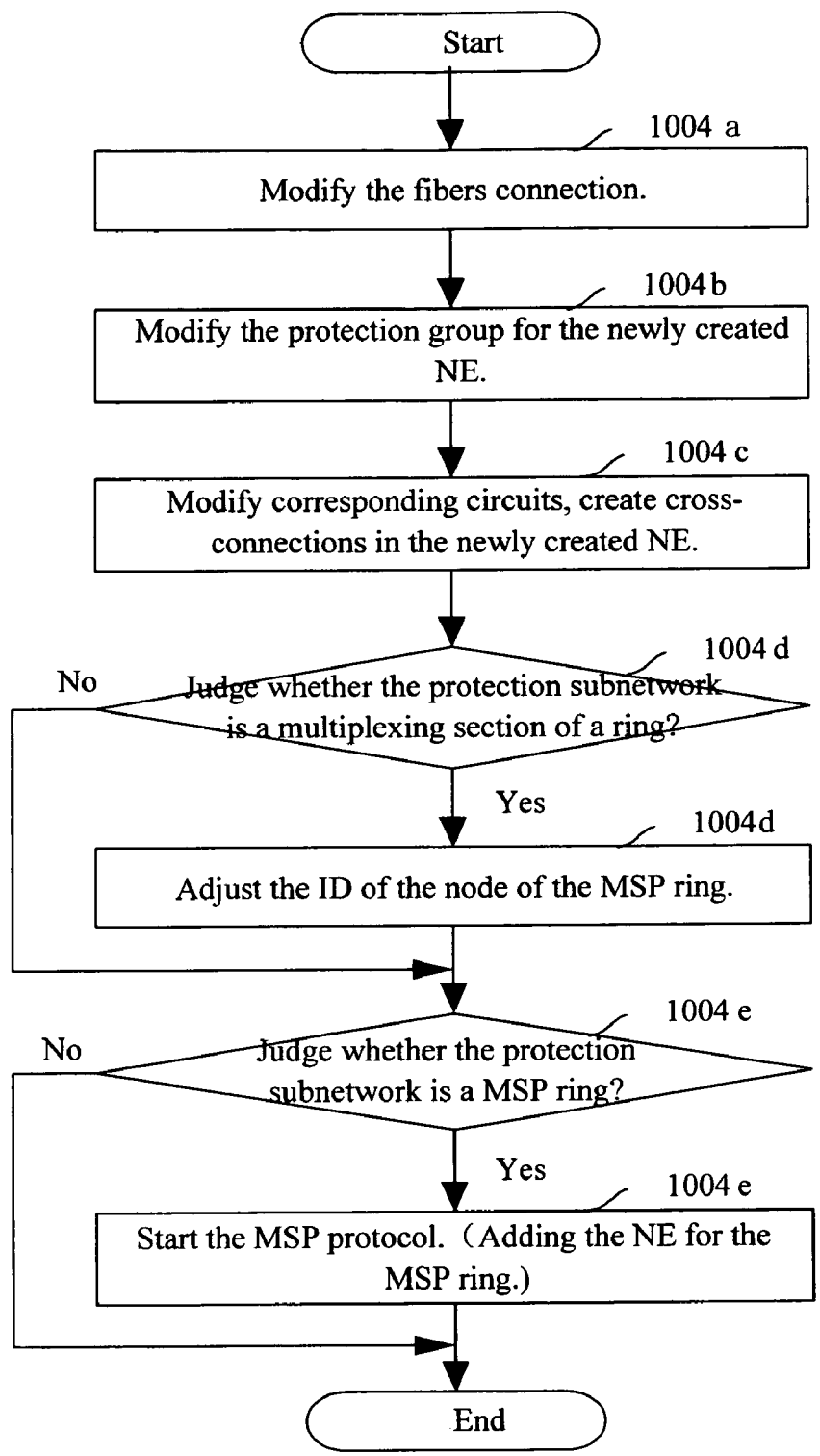
FIG. 12 shows a sub-flowchart for modifying data in the process of adding or deleting a network element on the protection subnetwork.

For adding an NE, step 1004 consists of the following sub-steps shown in FIG. 12.

Step 1004*a*: In the network layer, modify the fibers connection.

Step 1004*b*: In the configuration layer, modify the protection group for the configuration layer, including mainly adding nodes in the protection subnetwork, and deliver the modified data of the NE side to the corresponding NEs.

Step 1004*c*: In the configuration layer, modify the related circuits, create cross-connections on the newly created NE, and deliver the modified data of the NE side to the corresponding NEs.

Step 1004*d*: Judge whether the protection subnetwork is a MSP ring; if yes, adjust the ID of the node of the MSP ring and go to Step 1004*e*; otherwise go to Step 1004*e* directly.

Step 1004*e*: Judge whether the protection subnetwork is a MSP ring; if yes, start the MSP protocol and the procedure is ended, otherwise, the procedure is directly ended.

In the above sub-steps of Step 1004, the OS stores the current data before the reconstruction. Whenever a sub-step has been executed, the OS judges whether this sub-step is successful, waits, if there are data to be delivered to NEs, for the acknowledgement from the NEs and further judges whether the returned message is a message of success; if yes, the data after modification is stored and go to the next step; otherwise, a roll back operation is carried out, i.e. a reversed order of the modification operation is made to recover the state before the modification and an error message is prompted. If the roll back operation fails, the operation is stopped immediately, and the data before reconstruction are displayed for the user to deal with.

In addition, while the OS is carrying out the operation of the reconstruction and the roll back operation as described above, the OS can provide a real-time display of the modification and the progression so that the whole procedure is made more visible.

After the OS has modified the data and delivered the data to NEs, the control software of the NEs will receive the configuration layer data, but not deliver the data to the board. After the operation, the control software will control the NEs deliver the data to the board once for all so as to minimize the impact on the traffic.

The foregoing description is only the preferred embodiments of the invention and should not be construed as limiting to the protection scope of the invention.

The invention claimed is:

1. A method for implementing an optical network reconstruction comprising:
    a) an operating system (OS) receiving physical information needed for the optical network reconstruction;
    b) the OS calculating data needed to be modified for the optical network reconstruction based on the physical information and data related to the optical network reconstruction and stored in the OS, wherein the data needed to be modified comprises data needed to be modified at an OS side and data needed to be modified at a Network Element (NE side);
    c) the OS modifying the data needed to be modified at the OS side according to the calculation in b) and delivering the data needed to be modified at the NE side to at least one Network Element NE; and
    wherein the modification in c) is divided into sub-steps, and c) further comprises:
        the OS judging whether a sub-step is successful after the sub-step is executed, if the sub-step is successful, the OS storing the modified data and going to the next sub-step, and otherwise, the OS recovering any data having been modified from the sub-steps in a reversed order and rolling back to an original state before the optical network reconstruction.

2. A method according to claim 1, wherein the data needed to be modified at the OS side comprises a network layer data and a configuration layer data, and the data needed to be modified at the NE side comprises a configuration layer data, and wherein c) further comprises:
the OS modifying the network layer data and the configuration layer data at the OS side; and
delivering the configuration layer data at the NE side to the at least one NEs after modifying the configuration layer data at the OS side.

3. A method according to claim 1, further comprising:
the OS storing the data needed to be modified before each step of the optical network reconstruction; and
if the recovering fails, ending and displaying the data stored before the optical network reconstruction.

4. A method according to claim 1, wherein the optical network reconstruction is to add an extensive sub-rack, and c) comprises:
c11. in a configuration layer, deleting from a main-rack a cross-connections related to a tributary board to be moved, and delivering a data related to the deleting of the cross-connection and the data needed to be modified at the NE side to the at least one NE;
c12. in the configuration layer, deleting from the main-rack the tributary board to be moved, and delivering a data related to the deleting of the tributary board and the data needed to be modified at the NE side to at least one NE;
c13. in the configuration layer, creating in a main-rack line boards for a fiber connection, and delivering a data related to the creating of the fiber connection in the main-rack line board and the data needed to be modified at the NE side to at least one NE;
c14. in the configuration layer, creating in an extensive sub-rack line hoards for a fiber connection, and delivering a data related to the creating of the fiber connection in the extensive sub-rack line board and the data needed to be modified at the NE side to at least one NE;
c15. in the configuration layer, creating in the extensive sub-rack a tributary board, to which moving the tributary board of the main-rack, and delivering a data related to the creating of the tributary board and the data needed to be modified at the NE side to at least one NE;
c16. in a network layer, creating fibers and non-protected links between the main-rack and the extensive sub-rack;
c17. in the configuration layer, creating in the main-rack and the extensive sub-rack the cross-connections related to the moved tributary board; and delivering a data related to the creating of the fiber connection in the main-rack line board and the data needed to be modified at of the NE side to at least one NE; and
c18. in the network layer, modifying a circuits, then ending.

5. A method according to claim 1, wherein the optical network reconstruction is to move a board, and c) comprises:
c21. in a configuration layer, deleting a cross-connections related to a board to be moved, and delivering a data related to the deleting of the cross-connection and the data needed to be modified at the NE side to at least one NE;
c22. in the configuration layer, deleting a protection group for the configuration layer related to the board to be moved, and delivering a data related to the deleting of the protection group and the data needed to be modified at the NE side to the at least one NE;
c23. in the configuration layer, deleting the board to be moved, and delivering a data related to the deleting of the board and the data needed to be modified at the NE side to at least one NE;
c24. in the configuration layer, creating a board in a destination position, and delivering a data related to the creating of the board in the destination position and the data needed to be modified at the NE side to at least one NE;
c25. in the configuration layer, creating the protection group for the configuration layer on the created boards, and delivering the data related to the creating of the protection group and the data needed to be modified at the NE side to at least one NE;
c26. in the configuration layer, creating the cross-connections on the created board and delivering the data related to the creating of the cross-connection and the data needed to be modified at the NE Side to at least one NE; and
c27. in a network layer, modifying a circuits and a protection subnetworks according to the created board, then ending.

6. A method according to claim 1, wherein the optical network reconstruction is to modify a board type, and c) comprises:
c31. in a configuration layer, deleting a cross-connections related to a board of which the type is to be modified, and delivering a data related to the deleting of the cross-connection and the data needed to be modified at the NE side to at least one NE;
c32. in the configuration layer, deleting a protection group for the configuration layer related to the board of which the type is to be modified, and delivering a data related to the deleting of the protected group and the data needed to be modified at the NE side to at least one NE;
c33. in the configuration layer, deleting the board of which the type is to be modified, delivering a data related to the deleting of the board and the data needed to be modified at the NE side to at least one NE;
c34. in the configuration layer, creating a board with a destination type, and delivering a data related to the creating of the board with the destination type and the data needed to be modified at the NE side to at least one NE;
c35. in the configuration layer, creating the protection group for the configuration layer on the created board with the destination type, and delivering a data related to the creating of the protection group and the data needed to be modified at the NE side to at least one NE;
c36. in the configuration layer, creating the cross-connections on the created boards with the destination type, and delivering a data related to the creating of the cross-connection and the data needed to be modified at the NE side to at least one NE; and
c37. in a network layer, modifying a circuits and a protection subnetworks according to the created board with the destination type, then ending.

7. A method according to claim 1, wherein the optical network reconstruction is to add a Network Element (NE) on a protection subnetwork, and c) comprises:
c41. in a network layer, modifying fibers connection;
c42. in a configuration layer, modifying a protection group for the configuration layer, and delivering the data needed to be modified at the NE side to at least one NE;

c43. in the configuration layer, modifying a circuits, creating a cross-connection in an added NE, and delivering the data needed to be modified at the NEs side to at least one NE;

c44. judging whether the current protection subnetwork is a Multiplex Section Protection (MSP) ring; if yes, adjusting a NEs ID of the MSP ring and going to c45; otherwise, directly going to c45; and c45. starting a MSP protocol and ending.

8. A method according to claim 1, wherein the physical information of the optical network reconstruction comprises at least one element selected from the group consisting of: NE identity, board identity, port identity, fiber identity, and combinations thereof before and after the optical network reconstruction.

9. A method according to claim 1, further comprising after the OS delivers the data needed to be modified at the NE side of the optical network reconstruction to the at least one NEs, allowing the at least one NE to deliver the data needed to be modified at the NE side once for a board.

* * * * *